United States Patent [19]
Taneda et al.

[11] Patent Number: 5,801,352
[45] Date of Patent: Sep. 1, 1998

[54] POWER SUPPLY UNIT FOR DISCHARGE APPARATUS WHICH PREVENTS EXCESSIVE ELECTRODE WEAR

[75] Inventors: Atsushi Taneda; Koji Akamatsu; Hajime Ogawa; Satoshi Suzuki, all of Nagoya, Japan

[73] Assignees: Mitsubishi Denki Kabushiki Kaisha; Mitsubishi Electric Engineering Co., Ltd., both of Tokyo, Japan

[21] Appl. No.: 525,024

[22] Filed: Sep. 8, 1995

[30] Foreign Application Priority Data

Sep. 9, 1994 [JP] Japan ............................. 6-216245
Sep. 5, 1995 [JP] Japan ............................. 7-228102

[51] Int. Cl.⁶ ........................................................ B23H 7/14
[52] U.S. Cl. ..................................................... 219/69.18
[58] Field of Search .............................. 219/69.13, 69.18; 323/277, 282

[56] References Cited

PUBLICATIONS

Operational Amplifiers, Design and Applications, pp. 242–244, Dec. 1971.

*Primary Examiner*—Geoffrey S. Evans
*Attorney, Agent, or Firm*—Sughrue, Mion, Zinn, Macpeak & Seas, PLLC

[57] ABSTRACT

A power supply unit for a discharge machining apparatus which eliminates overshooting in current rise and improves the electrode consumption characteristics by preventing an operational amplifier as well as a current control element from being saturated, thereby eliminating overshooting during the rise time of the machining current, by clamping the output voltage of the operational amplifier during the stand-by time for electric discharge. The output is clamped by a plurality of resistors and diodes to a state where the output voltage is higher than a power-supply voltage (the output clamp level is set by a resistor). Namely, during the stand-by time when inverted amplification (feedback) via a resistor in an operational amplifier is being carried out, a constant state of feedback is maintained by the diodes.

18 Claims, 23 Drawing Sheets

MACHINING GAP VOLTAGE

CURRENT INSTRUCTION VALUE

OUTPUT CURRENT

FET GATE DRIVING SIGNAL

CLAMP LEVEL

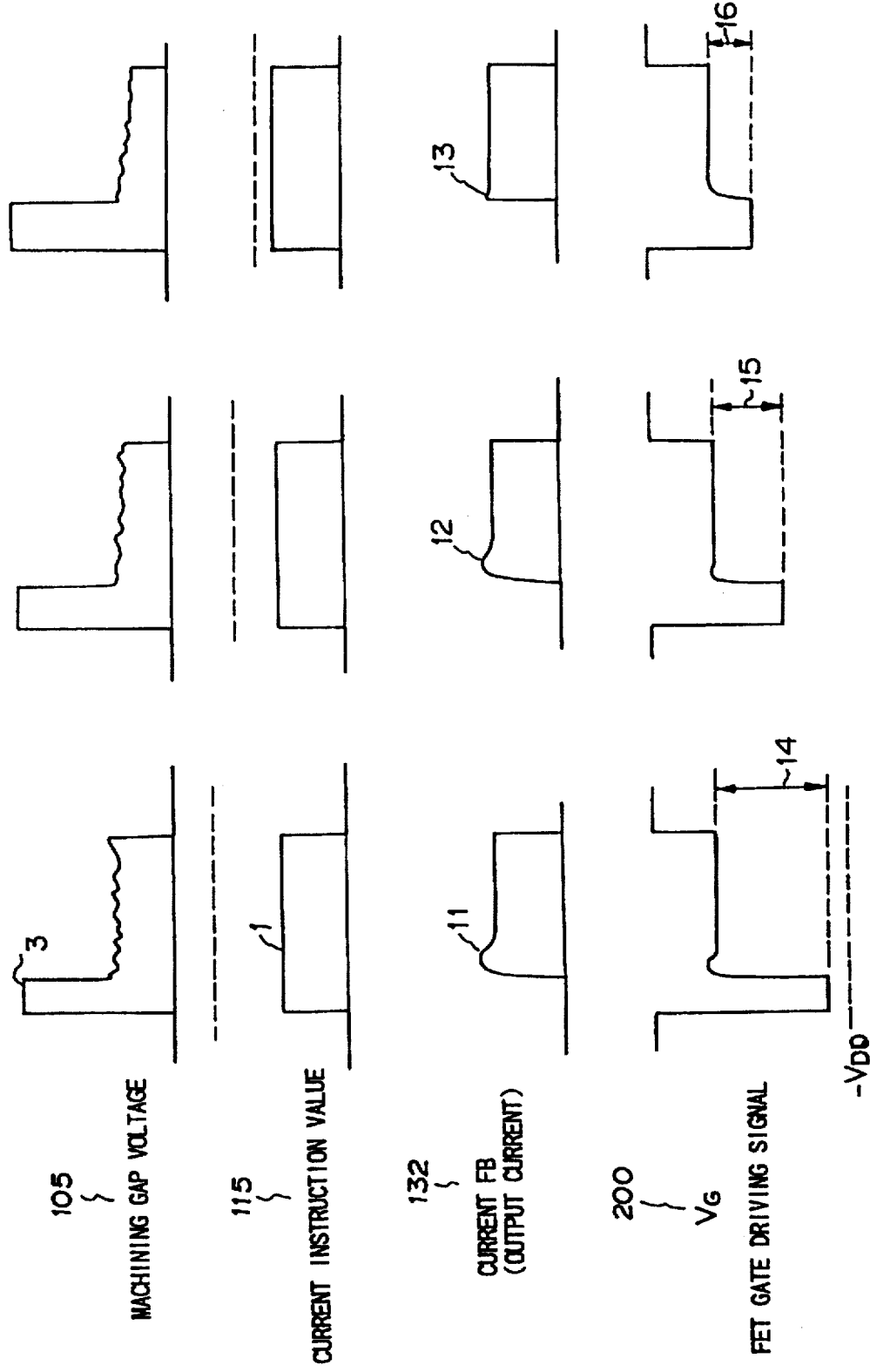

MACHINING GAP VOLTAGE

CURRENT INSTRUCTION VALUE

OUTPUT CURRENT

FET GATE DRIVING SIGNAL

CLAMP LEVEL

F I G. 8B
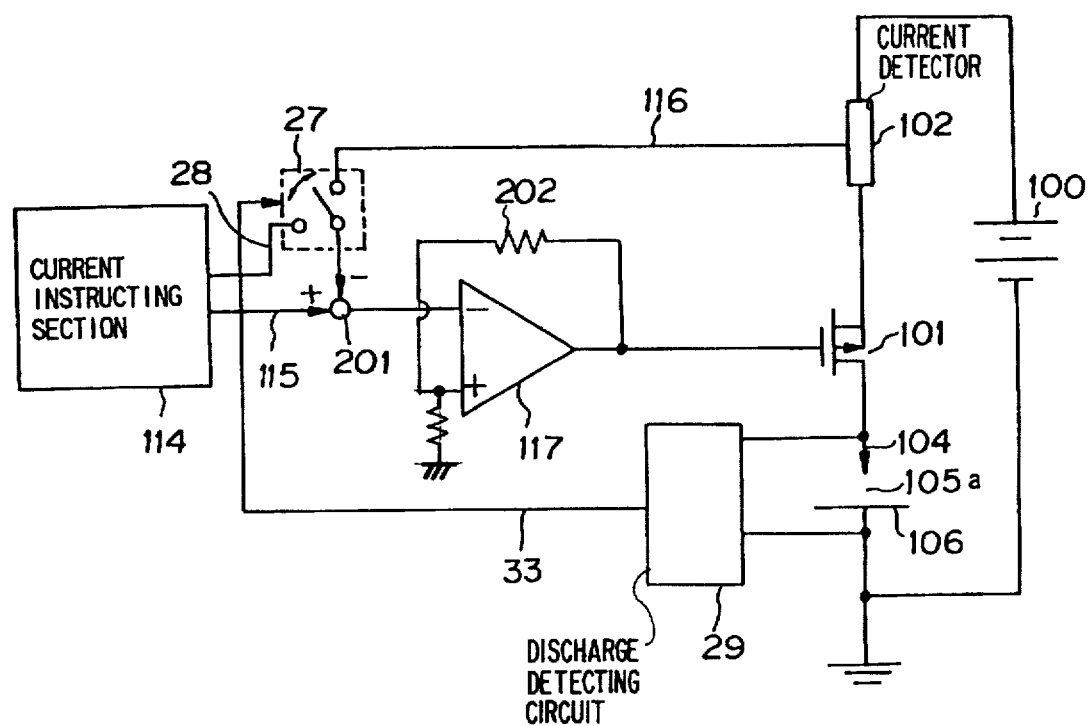

FIG. 9A
MACHINING GAP VOLTAGE Vg
FIG. 9B
CURRENT INSTRUCTION VALUE
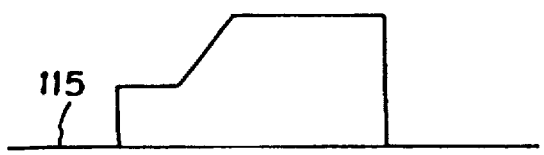
FIG. 9C
CURRENT FB (OUTPUT CURRENT)
FIG. 9D
FET GATE DRIVING SIGNAL $V_G$
FIG. 9E
ELECTRIC DISCHARGE DETECTION VALUE
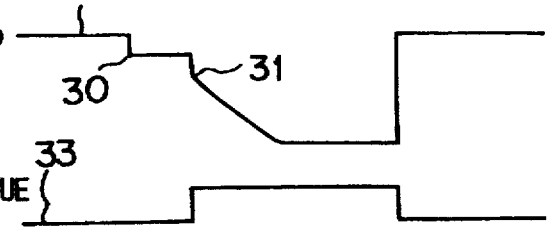

MACHINING GAP VOLTAGE Vg

CURRENT INSTRUCTION VALUE

CURRENT FB (OUTPUT CURRENT)

FET GATE DRIVING SIGNAL $V_G$

ELECTRIC DISCHARGE DETECTION VALUE 33, 33'

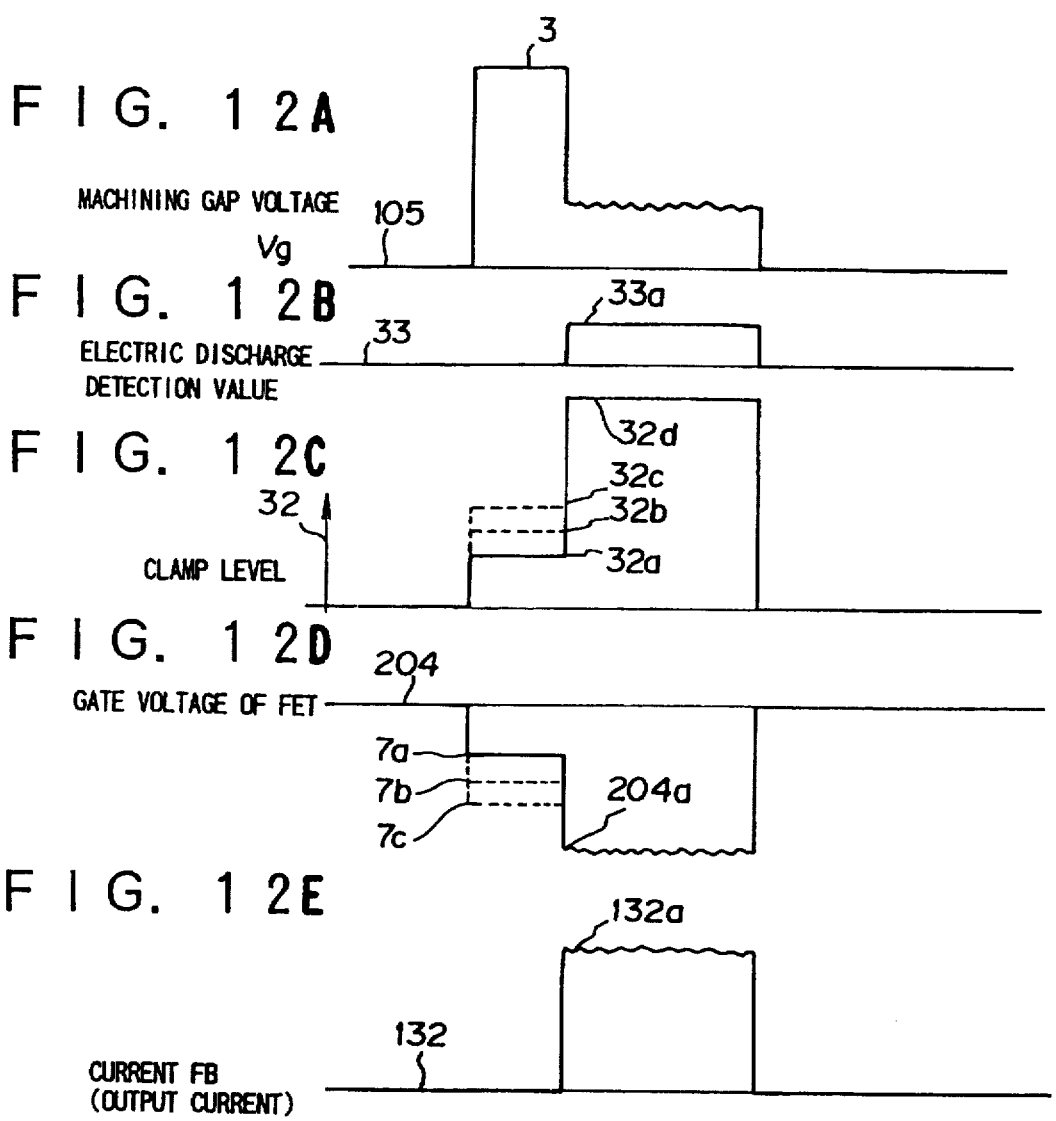

F I G. 1 8
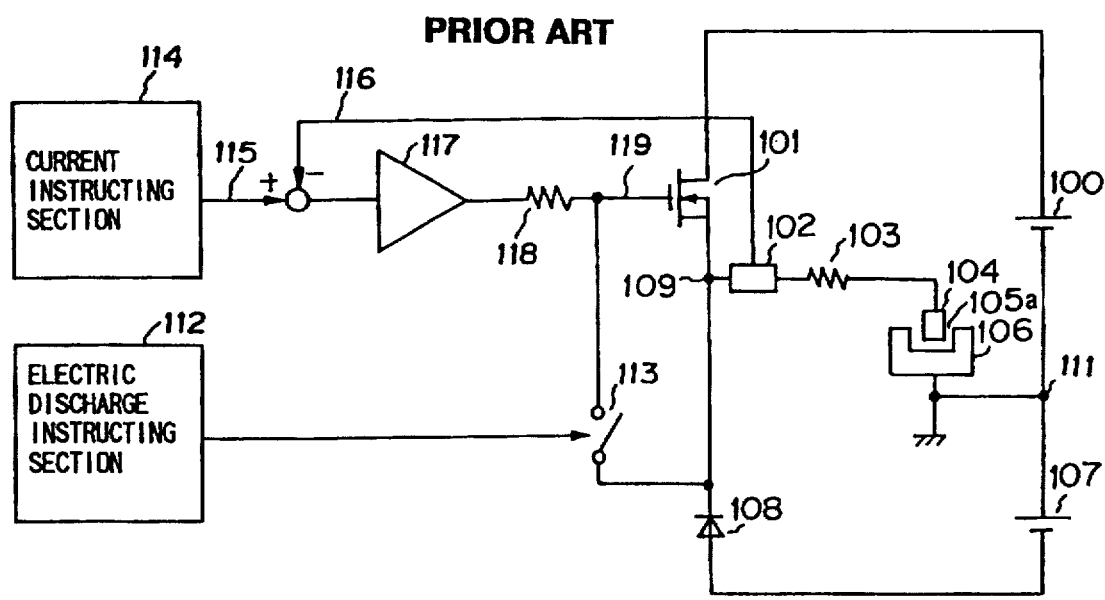

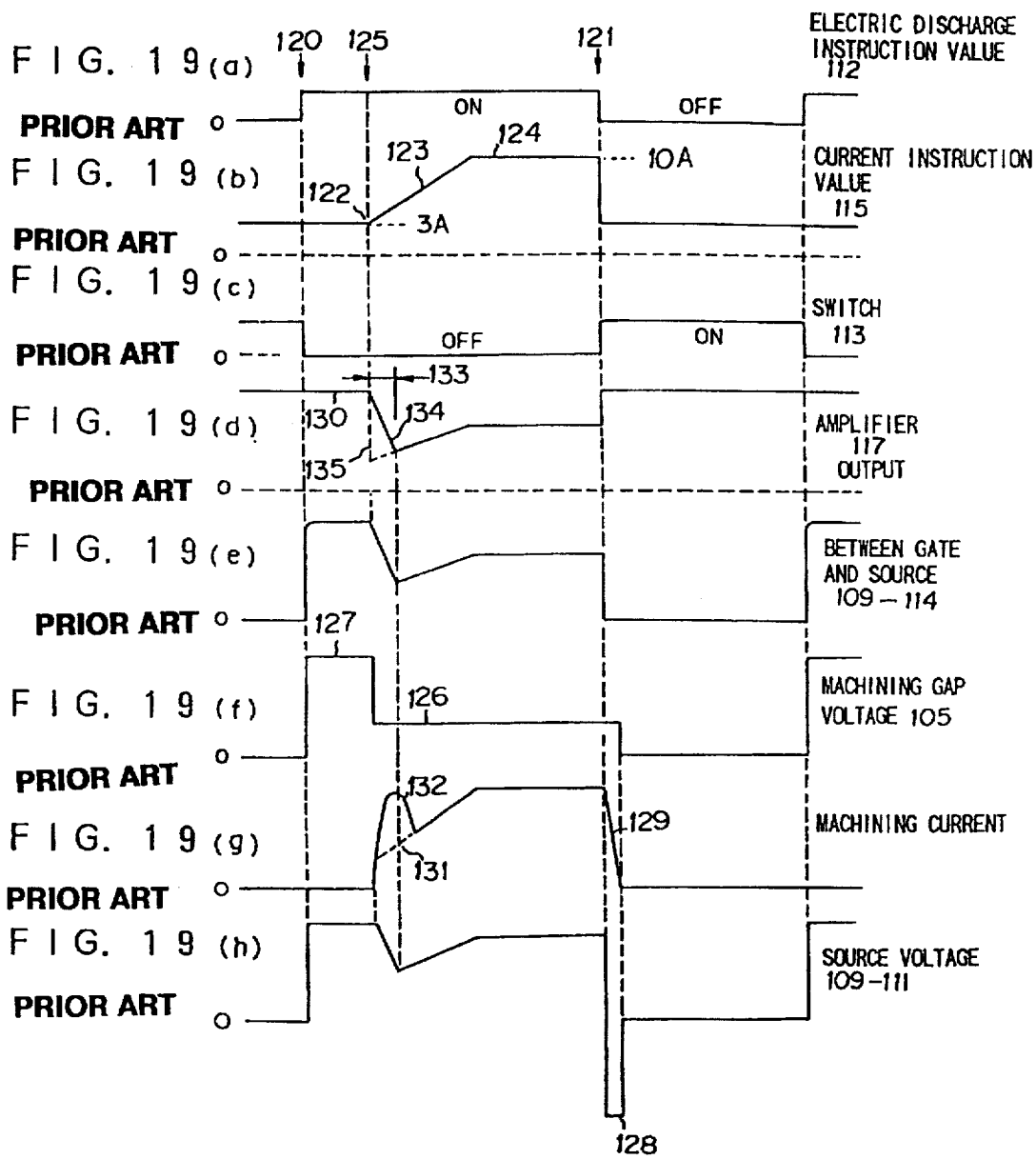

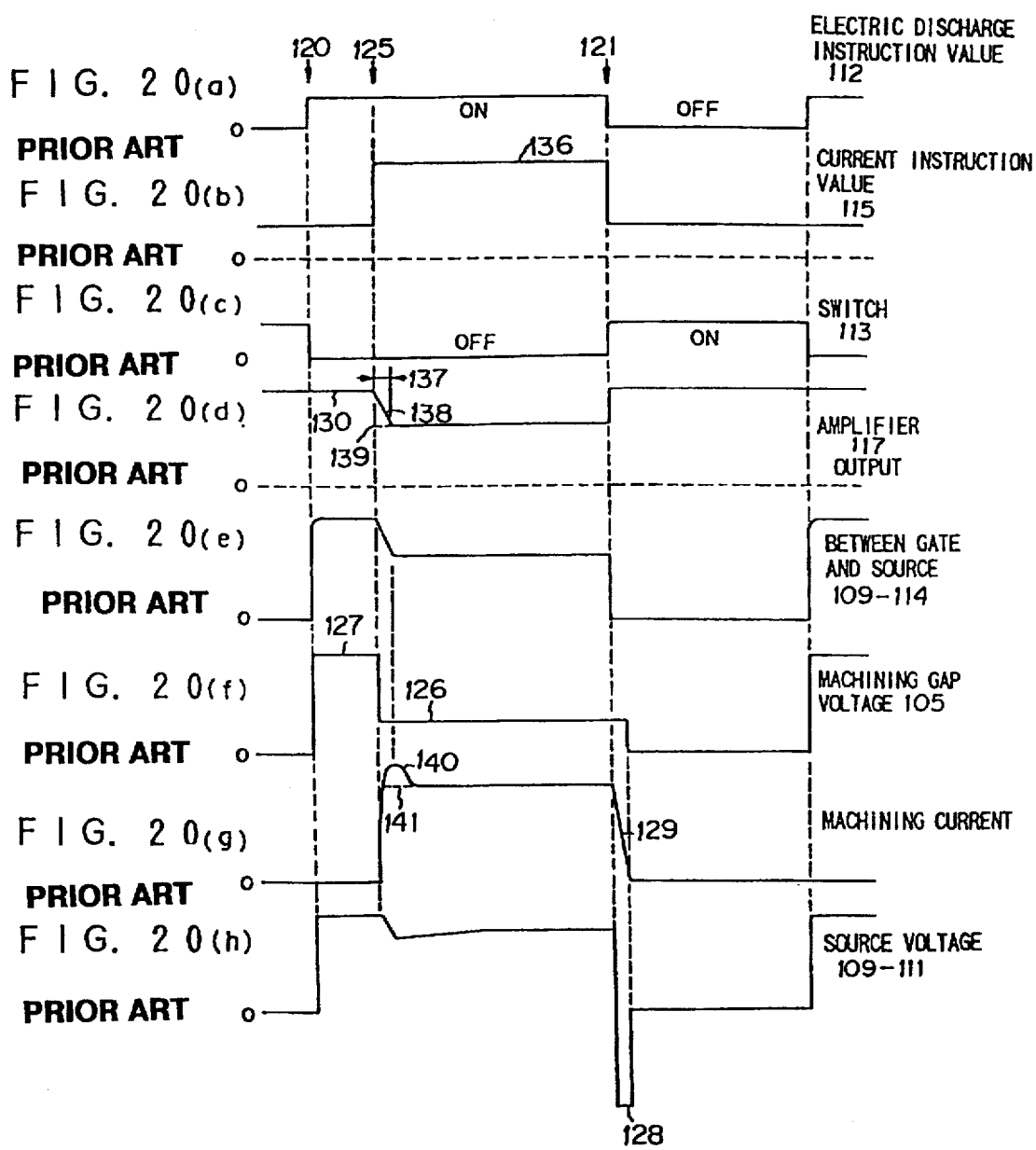

POWER SUPPLY UNIT FOR DISCHARGE APPARATUS WHICH PREVENTS EXCESSIVE ELECTRODE WEAR

FIELD OF THE INVENTION

The present invention relates to a power supply unit for a discharge apparatus for supplying electric power for machining between an electrode, provided in machining fluid, and a workpiece. More particularly, the invention relates to a power supply unit for a discharge apparatus which eliminates overshooting in current rise and improves the electrode consumption characteristics.

BACKGROUND OF THE INVENTION

An example of a conventional power supply unit for an electric discharge machining apparatus is shown in FIG. 18. In this conventional approach, the difference between a detected value of the machining current and an instruction value from a current instructing section is amplified, the operating resistance of a current control element is controlled according to the amplified signal, a switch turned ON/OFF according to a signal from the electric discharge instructing section is provided in the control input side of the current control element, and electric power for machining is obtained by rapidly disconnecting a current control element when the switch is turned OFF.

A detailed description of the electric discharge machining apparatus shown in FIG. 18 will now be given.

In FIG. 18, designated at reference numeral 100 is a power supply unit, at 101 a current control element, at 102 a current detector, at 103 a resistor, at 104 an electrode, and at 106 a workpiece. Also, reference numeral 105a indicates a machining gap. The space between the electrode 104 and the workpiece 106 is filled with a machining fluid to form a small gap where electric discharge can be performed. Electric discharge machining is executed on the workpiece 106 by the electric discharge phenomenon generated in this gap.

The power supply unit 100, current control element 101, current detector 102, resistor 103, electrode 104, and workpiece 106 are connected to each other in series. Reference numeral 107 indicates a constant voltage source. This constant voltage source 107 and a diode 108 are connected in series, and the series combination is connected between the source 109 of the current control element 101 and a point connected to the workpiece 106 and the power supply unit 100.

Furthermore in this figure, reference numeral 112 indicates an electric discharge instructing section. A switch 113 opens and closes a connection between the gate 119 and the source 109 of the current control element 101 according to a signal from the electric discharge instructing section 112. Namely, the current control element 101 is switched between a controllable state and a disconnected state.

Reference numeral 114 indicates a current instructing section. The difference between an instruction value 115 from the current instructing section 114 and a detected value 116 detected by the current detector 102 is amplified by an amplifier 117 and applied to the gate 114 of the current control element 101 via a resistor 118 to control the operating resistance of the current control element 101 when the switch 113 is OFF, and to provide control so that the machining current is made equal to an instruction value of the current when machining current flows.

Next, a detailed description will be given of the operation of the circuit above with reference to FIG. 19.

It should be noted that the following description relates to a case where the waveform of the machining current in a rising portion thereof is sloped as shown in FIG. 19 at (b). FIG. 19 at (a) shows an instruction value from the electric discharge instructing section 112. Instructions for turning the electric discharge ON and OFF are issued at times 120 and 121, respectively. According to the instructions, the state of the switch 113, as shown in FIG. 19 at (c), is turned OFF at 120 and ON at 121.

FIG. 19 at (b) shows an instruction value 115 from the current instructing section 114. The waveform for an instruction value for a 3 amp machining current is issued at 122, then the instruction value is increased as indicated at 123. A waveform for an instruction value of a 10 amp current is generated before electric discharge is started.

A waveform most suited to electric discharge machining can be produced because any waveform can be instructed. When an instruction for electric discharge is set to ON at 120, the switch 113 is turned OFF. The output from the amplifier 117 shown in FIG. 19 at (d) is high because no machining current is then flowing, and for this reason the gate of the current control element 101 is driven as shown in FIG. 19 at (e) via the resistor 118. Thus, the operating resistance of the current control element 101 is lowered.

In this state, machining current does not flow yet. At time 125 when an electric discharge is generated in the machining gap 105a, the machining current detected by the resistor 103 and the operating resistance of the current control element 101 are as shown in FIG. 19 at (g), and the machining gap voltage 105, which so far has been equal to the voltage 127 of the first power supply unit 100, is changed to an electric discharge voltage, as indicated at 126 in FIG. 19 at (f).

Also, the machining current changes according to the current instruction signal 115, as shown in FIG. 19 at (g). At 121, when the instruction for electric discharge is turned OFF, the switch is turned ON, whereupon the current control element 101 is disconnected. As a result, a negative high voltage is produced due to the inherent inductance of the wiring and the resistor 103, which acts as a voltage from the source 109, but the diode 108 limits the voltage of the constant voltage unit 107 electrically connected to the diode 108, as shown at 128 in FIG. 19 at (h). As a result, the machining current rapidly decreases, as shown at 129 in FIG. 19(g).

In addition, reference may be made to Japanese Patent Laid-Open Publication No. 123614/1988 disclosing a "Method of Electric Discharge Machining", Japanese Patent Laid-Open Publication No. 228520/1991 disclosing a "Method of Controlling Power Supply for. Electric Discharge Machining", Japanese Patent Laid-Open Publication No. 210219/1989 disclosing an "Electric Discharge Machining Current Control Circuit", and Japanese Patent Laid-Open Publication No. 68316/1988 disclosing an "Electric Discharge Machining Apparatus".

However, there are several problems with the above conventional approach, as described below.

During the stand-by time for electric discharge, namely in the period from when an instruction value for electric discharge is set to ON at 120 until an electric discharge is actually generated at 125, machining current does not flow. As a result, since there is no feedback for current control, the maximum voltage is outputted from the amplifier 117, as shown at 130 in FIG. 19 at (d). Also, the current control element 101 controlled by this voltage is saturated, and the operating resistance is reduced to When electric discharge is generated at 125, a machining current flows, and TE feedback is started, so that current feedback control is performed in such a manner that the value of the machining current is made equal to the instructed current value. However, when feedback is cut, the maximum voltage is outputted from the operational amplifier 117, indicating saturation thereof, and for this reason also the current limiting element 101 is in the saturated state. Simultaneously when electric discharge is detected at 125, the current feedback signal returns, but until the operational amplifier 117 and the current control element 101 are restored from the saturated state to their respective normal states, the time shown at 133 in FIG. 19 at (d) is required, and the waveform of the output from the operational amplifier 117 shown in FIG. 19(d) is delayed, as indicated at 134 (indicated by a solid line), from the desired waveform at 135 (indicated by a dotted line). For this reason, the rising waveform of the current substantially overshoots, as shown at 132 (indicated by a solid line) in FIG. 19 at (g), making the waveform substantially different from that at 131 (indicated by a dotted line) in FIG. 19 at (g) showing a desirable slope current waveform.

FIG. 20 shows a case where the machining current has a rectangular waveform. The same reference numerals as applied in FIG. 19 indicate the same signals. The current instruction value in FIG. 20 at (j) is rectangular, as shown at 136. As in case of a slope current, a certain period of time, shown at 137 in FIG. 20 at (l), is required until the unsaturated state in which normal control is provided is restored from the saturated state, and thus the output from the amplifier 117 shown in FIG. 20 at (l) has a waveform delayed as shown at 138 from a desired waveform 139. For this reason, the rising waveform of the current substantially overshoots as shown at 140 in FIG. 20 at (o), and the waveform is significantly delayed from the desired rectangular current waveform as shown at 141 in FIG. 20 at (o). Overshooting during the rise time of the current deteriorates the electrode consumption characteristics during electric discharge machining.

SUMMARY OF THE INVENTION

It is an object of the present invention to provide a power supply unit for electric discharge machining having improved electrode consumption characteristics by preventing the operational amplifier as well as the current control element from being saturated, thereby eliminating overshooting during the rise time of the machining current, by clamping the output voltage of the operational amplifier during the stand-by time for electric discharge.

In a power supply unit in an electric discharge machining apparatus according to the present invention, the output is clamped by a plurality of resistors and diodes to a state where the output voltage is higher than a power-supply voltage (the output clamp level is set by a resistor). Namely, during the stand-by time when inverted amplification (feedback) via a resistor in an operational amplifier is being carried out, a constant state of feedback is maintained by the diodes.

Also in a power supply unit for an electric discharge machining apparatus according to the present invention, the operational amplifier can be set to an active area by switching a clamp voltage in multiple ways using a plurality of resistors, and in addition a gate voltage in the FET shifts more rapidly so that a current waveform with less overshooting can be obtained.

In a power supply unit for an electric discharge machining apparatus according to the present invention, the clamp level is configured as a clamp pattern corresponding to the current waveform, so that overshooting seldom occurs even for a complicated waveform. Namely, the output from the current instructing section is divided into two portions and is outputted to an operational amplifier driving the FET as well as to a second operational amplifier. A prespecified clamp pattern is generated by previously setting a negative return gain in the second operational amplifier to a level slightly higher than the gain of the first operational amplifier. This clamp pattern is formed according to a current instruction value so that the clamp pattern can easily respond to a change of a current peak value, and also the gate voltage of the FET can be maintained in an appropriate state even when an instruction value for a current waveform having a complicated form other than rectangular is issued, as a result of which an extremely precise current waveform can be obtained.

In a power supply unit for an electric discharge machining apparatus according to the present invention, during the stand-by time prior to production of electric discharge, saturation of the operational amplifier and FET is suppressed by disconnecting the current feedback control loop. Namely, a switch for turning ON/OFF a current detection signal from a current detector is provided, and the switch turns ON/OFF the feedback signal according to an instruction from the electric discharge detection circuit.

In a power supply unit for an electric discharge machining apparatus according to the present invention, a clamp level set during the stand-by time is released when electric discharge is started, and the clamp is turned ON/OFF according to an output from an electric discharge detection circuit. Immediately after the electric discharge starts, an output can be obtained from the current detector, so that an output current waveform as instructed can be obtained. Namely, the clamp level during the stand-by time for electric discharge is set according to a current instruction value, and the clamp is released according to a signal from the electric discharge detector after electric discharge starts.

In a power supply unit for an electric discharge machining apparatus according to the present invention, when a non-inverting amplifier circuit is used as an operational amplifier, the output voltage level during stand-by time goes up even when a current instruction value becomes larger, so that a state close to the optimal clamp voltage can be maintained.

Other objects and features of this invention will become understood from the following description with reference to the accompanying drawings.

BRIEF DESCRIPTION OF THE DRAWINGS

FIGS. 4A–4C are explanatory views for an explanation of the operations of the power supply unit for an electric discharge machining apparatus according to Embodiment 2 above;

FIGS. 8A and 8B are explanatory views showing the configuration of a power supply unit for an electric discharge machining apparatus according to Embodiment 4 of the present invention;

FIG. 9 is an explanatory view for an explanation of operations of the power supply unit for an electric discharge machining apparatus according to Embodiment 4 above;

FIG. 12 is an explanatory view for an explanation of the operations of the power supply unit for an electric discharge machining apparatus according to Embodiment 5 above;

FIG. 18 is an explanatory view showing the configuration of a power supply unit for a conventional an electric discharge machining apparatus;

FIG. 19 is an explanatory view for an explanation of the operations of the conventional power supply unit for an electric discharge machining apparatus; and FIG. 20 is an explanatory view for an explanation of the operations of the conventional type of power supply unit for an electric discharge machining apparatus.

DESCRIPTION OF THE PREFERRED EMBODIMENTS

A detailed description is given hereinafter of preferred embodiments of a power supply unit for an electric discharge machining apparatus according to the present invention.

Figure 1A:
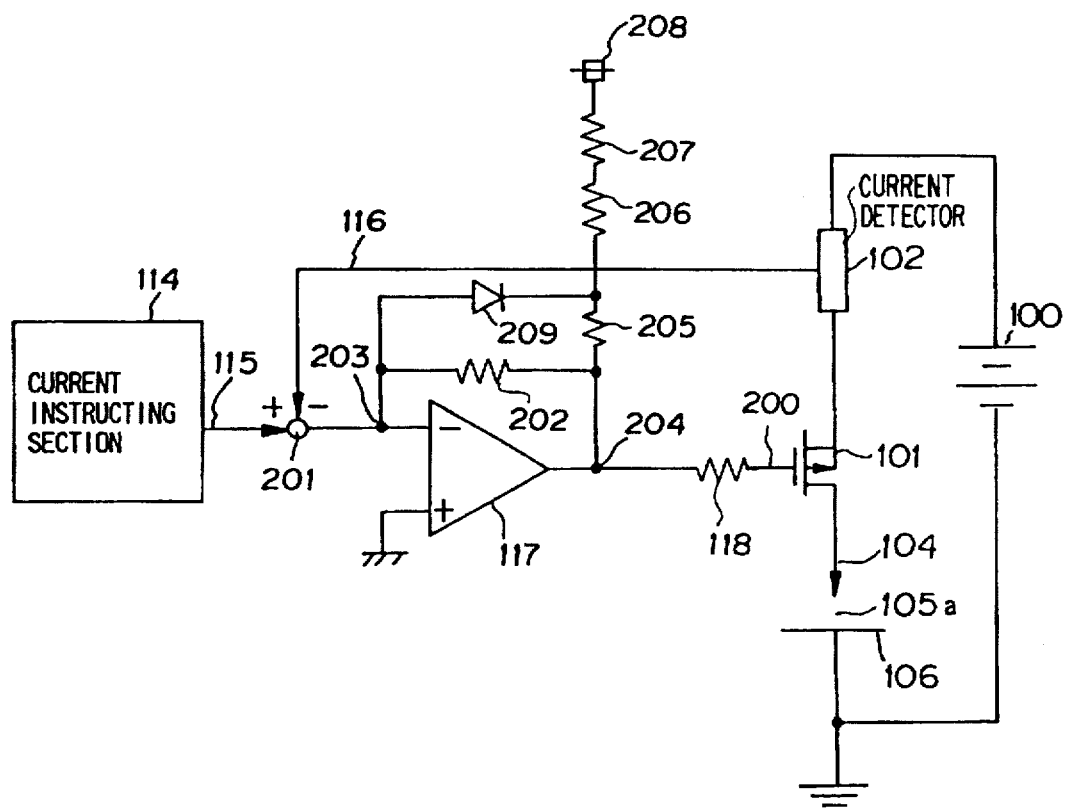
FIGS. 1A and 1B are explanatory views showing the configuration of a power supply unit for an electric discharge machine according to Embodiment 1 of the present invention described herein.

At first a description will be provided for Embodiment 1. FIG. 1A shows the configuration of a power supply unit constructed according to Embodiment 1, and FIG. 2 illustrates the operations thereof. In FIG. 1A, a machining circuit includes a DC power supply unit 100, a current detector 102, a semiconductor FET amplifier 101 (referred to merely as an FET hereinafter), a machining electrode 104, a machining gap 105a, and a workpiece 106 connected to each other in series.

A power transistor, a power MOSFET or the like can be used as the FET 101. This embodiment is described assuming a p-channel type power MOSFET, but the operations are essentially the same when an N-channel type or other type power semiconductor device is used.

An instruction waveform according to a current instruction signal 115 obtained from the current instructing section 114 is output, for instance, as shown at 115 in FIG. 2, to obtain an output current having a rectangular waveform. When an instruction current peak value 1 for a current instruction signal 115 is set, an FET gate driving signal 200 is driven as shown at 2, and an machining gap voltage 105 is applied to a machining gap 105a as shown at 3. Then, after the stand-by time until an electric discharge has commenced and electric discharge machining started, the current in the machining gap 105a, namely, an output current 132, rises as shown at 4.

In Embodiment 1, as shown in FIG. 1A, the output 204 from the operational amplifier which drives the gate of the FET 101 via a limiting resistor 118 is raised by resistors 205, 206, 207 as well as by a voltage source 208, and furthermore a diode 209 is inserted between an input terminal 203 of the operational amplifier 117 and resistors 205, 206.

The direction in which the diode 209 is installed varies according to the type of FET used, namely according to whether the FET is P type or N type, or according to the configuration of the operational amplifier. In this embodiment where a p-type FET is directly driven by the operational amplifier 117, the diode 209 is connected from the input terminal to the output terminal as shown in the figure. It should be noted that reference numeral 201 indicates a subtracter for calculating the difference between the current instruction signal 115 from the current instructing section 114 and the detection signal 116 from the current detector 102.

Figure 1B:
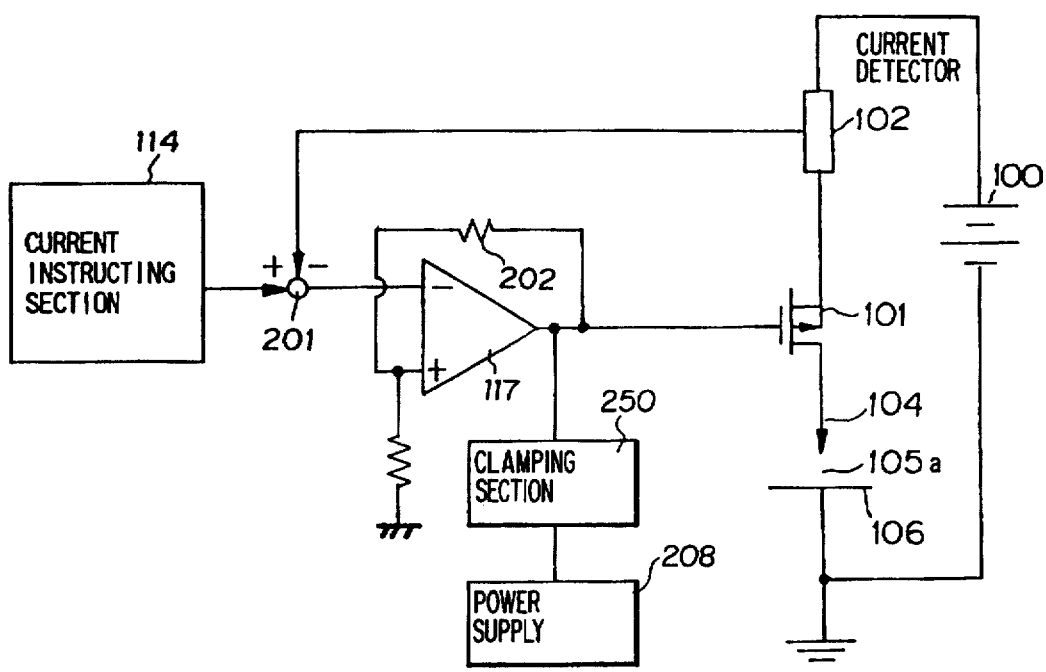
Figure 2A:
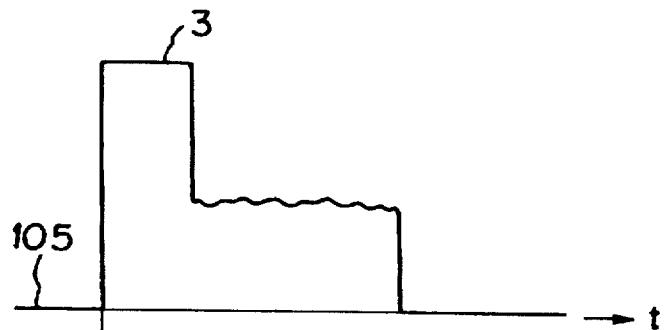
FIG. 2 is an explanatory view for an explanation of operations of the power supply unit for an electric discharge machine according to Embodiment 1.
Figure 2B:
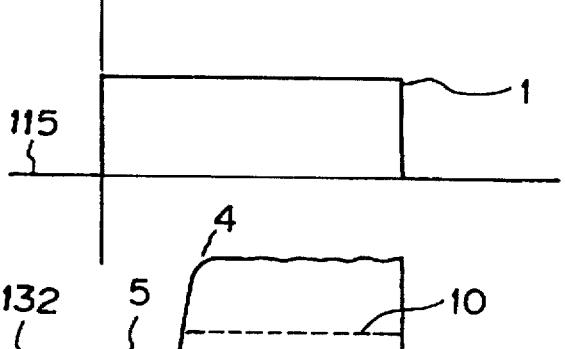
Figure 2C:
Figure 2D:
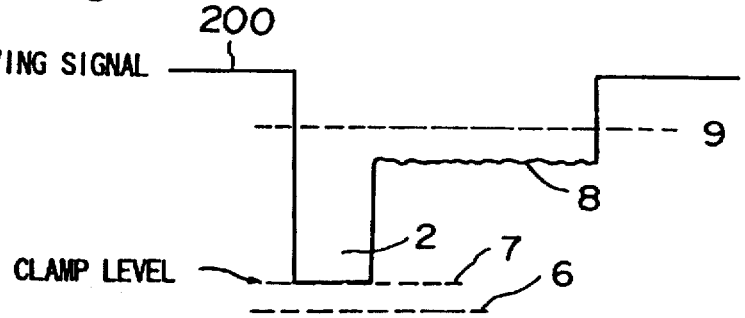

During the stand-by time, the output current 132 is held at zero (0) as shown at 5 in FIG. 2, so that a positive signal is applied to the input terminal 203 of the operational amplifier 117. The gain of the operational amplifier 117 is set to a relatively high value, but the output does not go up or down below the voltage of the driving power supply. In FIG. 1A where the operational amplifier 117 is connected as an inverting amplifier, the output goes near the voltage of the feedback power supply, and the FET gate driving signal 200 for the p-channel is turned ON. In FIG. 1B the operational amplifier 117 is connected as a non-inverting amplifier, with the clamping section 250 provided in series between the output terminal of the operational 177 and the power supply 208.

In this embodiment, however, due to the presence of the three resistors 205, 206, 207 and the diode 209, the output voltage is clamped to a value shown at 7 which is higher than the negative power-supply voltage, and does not go below that level (see FIG. 2). This output clamp level is set with the resistors 205, 206, 207. Given that the power-supply voltage for the operational amplifier 117 is in a range of ±15 V, clamping can be performed at, for instance, −10 V. Namely, during the stand-by time for electric discharge, inverting amplification (feedback) by the resistor 202 in the operational amplifier 117 is maintained by the diode 209.

Generally, as mentioned above, if the operational amplifier 117 cannot maintain feedback and the output is in the saturated state, a long time is required to shift from the saturated state to the unsaturated state, namely to the active state, which is the normal state for operation. In contrast, in this embodiment, as the output from the operational amplifier is maintained in the unsaturated state, electric discharge is generated, and in association with the rise of the electric discharge current, namely the current feedback signal (output current) 132 from the current detector 102 (see FIG. 2), the output from the operational amplifier 117, namely the FET driving signal 200, rapidly changes.

For this reason, the rate of rise of the current waveform (output current) 132 obtained in the machining gap 105a is extremely high with a low rate of overshoot, and as a waveform extremely close to the current instruction signal 115 from the current instructing section 114 can be obtained, a stable machining state can be obtained and high speed machining can be performed.

It should be noted that, in case of this operation, the level of the FET gate driving signal 200 which can achieve a peak value 1 of the current instruction value 115 is as indicated at 8 in the figure, if the clamp level goes down, for instance, as shown at 9 in the figure, only an output current peak value lower than the current instruction signal 115 can be obtained, and the level will be as indicated at 10 in the figure, so that the clamp level cannot be set to an extremely low level.

Next, a description will be given of Embodiment 2 of the present invention with reference to FIG. 3A and FIG. 4A–4C. Generally, the current peak value in electric discharge machining, namely, the peak value of the current instruction signal 115 from the current instructing section 114, is set to various levels according to the machining conditions. When the above clamp level is set to a level where an output from the operational amplifier 117 is not saturated, the rising speed of the machining current can be made higher, but when a target level for the FET gate driving signal (VG) 200 is substantially different from the clamp level, even if the operational amplifier 117 is in the active region during the stand-by time for electric discharge, sometimes overshooting occurs until the gate signal settles to a constant level, so that it appears as overshoot of a current waveform. Such an occurrence is shown, for instance, at 11 in FIG. 4A.

The rate of change of the gate signal can be made smaller by setting the clamp level to a value close to the target value of the gate signal, and as a result the overshoot can be made smaller. FIGS. 4A, 4B, and 4C show the state above respectively, and the clamp level in FIG. 4B is closer to a target value of the gate signal than that in FIG. 4A, and that in FIG. 4C is closer than that in FIG. 4B.

Namely when the operational amplifier 117 and the FET gate driving signal 200 are set to a value closer to a signal level corresponding to a current peak value, the amount of overshooting during the rising period can be made smaller, so that an output current waveform closer to the current instruction signal 115 can be obtained. As a result, during machining a uniform surface can be realized even while machining at a high speed.

Figure 3A:
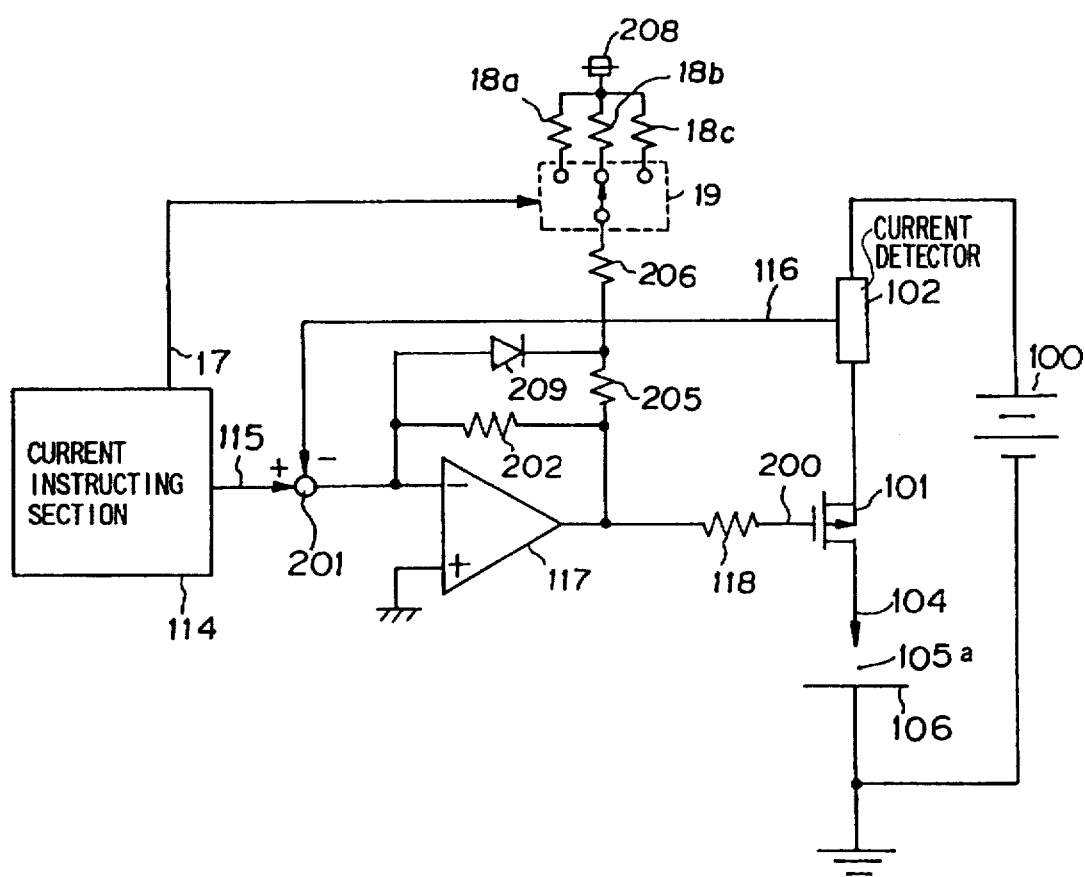
FIGS. 3A and 3B are explanatory views showing the configuration of a power supply unit for an electric discharge machine according to Embodiment 2 of the present invention.

FIG. 3A shows an example in which these functions are realized. In this example the clamp level is changed by switching a plurality of resistors such as resistors 18a, 18b, and 18c according to a current instruction 17 from the current instruction section 114. Reference numeral 19 indicates a switch for switching the resistor 18 according to an instruction 17 from the current instructing section 114.

Figure 5:
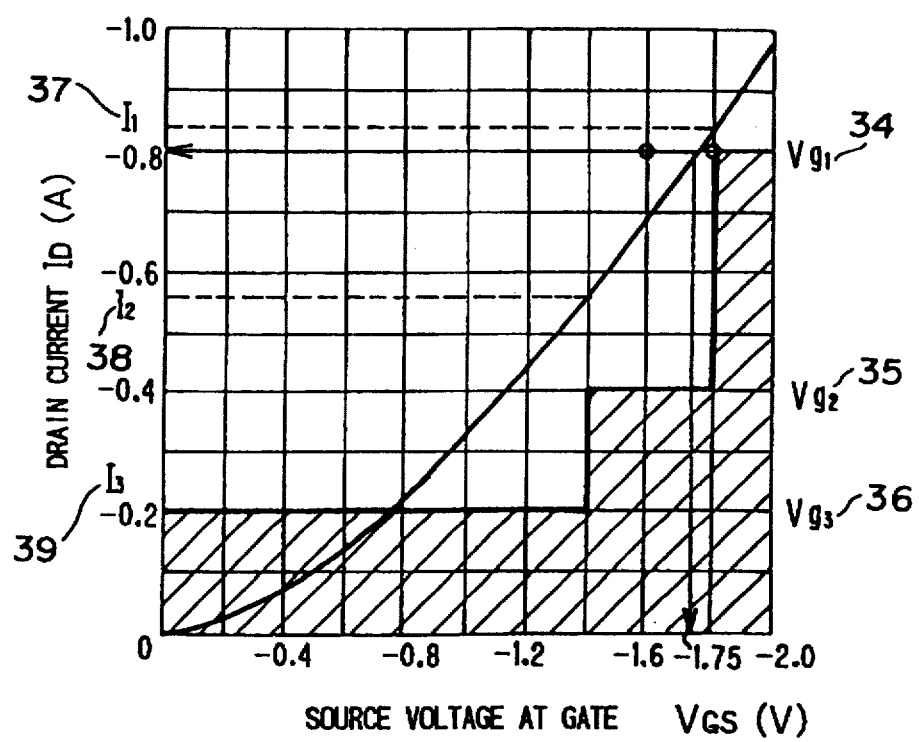
FIG. 5 is a graph showing gate voltage—drain current characteristics.

The FET in this embodiment may, for example, be a type 2SJ48. In this FET, the linearity of the drain current with respect to gate voltage is high, and this FET is suited for continuously controlling a current value. The relationship between the gate voltage and drain current is generally as shown in FIG. 5. It is understood from FIG. 5 that, if a current of 0.8 amp is set as a target machining current, namely, as the drain current, the gate voltage is will finally converge to −1.75 V because of the current feedback control, and the peak current of 0.8 amp is maintained.

For this reason, if a clamp voltage level is set to a value extremely close to −1.75 V, namely −1.8 V or $Vg_1$ (34), the gate voltage little changes, so that the amount of current overshooting is reduced to an extremely low level as shown in FIG. 4C. Of course, if the clamp voltage drops to, for instance, −1.6 V, a desired current peak value cannot be obtained, and even if the clamp voltage is just −1.75 V, the controllable range becomes very narrow, so that feedback control absorbing various types of external disturbances cannot be established. Thus, it is necessary to clamp to a negatively high voltage level somewhat higher than the final gate voltage, and the clamp voltage must be set to a value slightly higher than the desired voltage value, namely, the final gate voltage.

In this embodiment, the clamp voltage is switched in three ways using three resistors 18a, 18b, and 18c, and the clamp voltage level is set to, for instance, $Vg_1$ (34), $Vg_2$ (35), and $Vg_3$ (36), as shown in FIG. 5. Namely, if it is desired to obtain $I_2$ (approx. 0.55 A) 38 from the output current $I_3$ (approx. 0.2 A) 39, the clamp voltage $Vg_3$ (36) is used, if it is desired to obtain $I_1$ (0.85 A) 37 from $I_2$ (approx. 0.55 A) 38, the clamp voltage $Vg_2$ (35) is used, and if it is desired to obtain $I_1$ (approx. 0.85 A) 37 or more, the clamp voltage $Vg_1$ (34) is used.

Figure 3B:
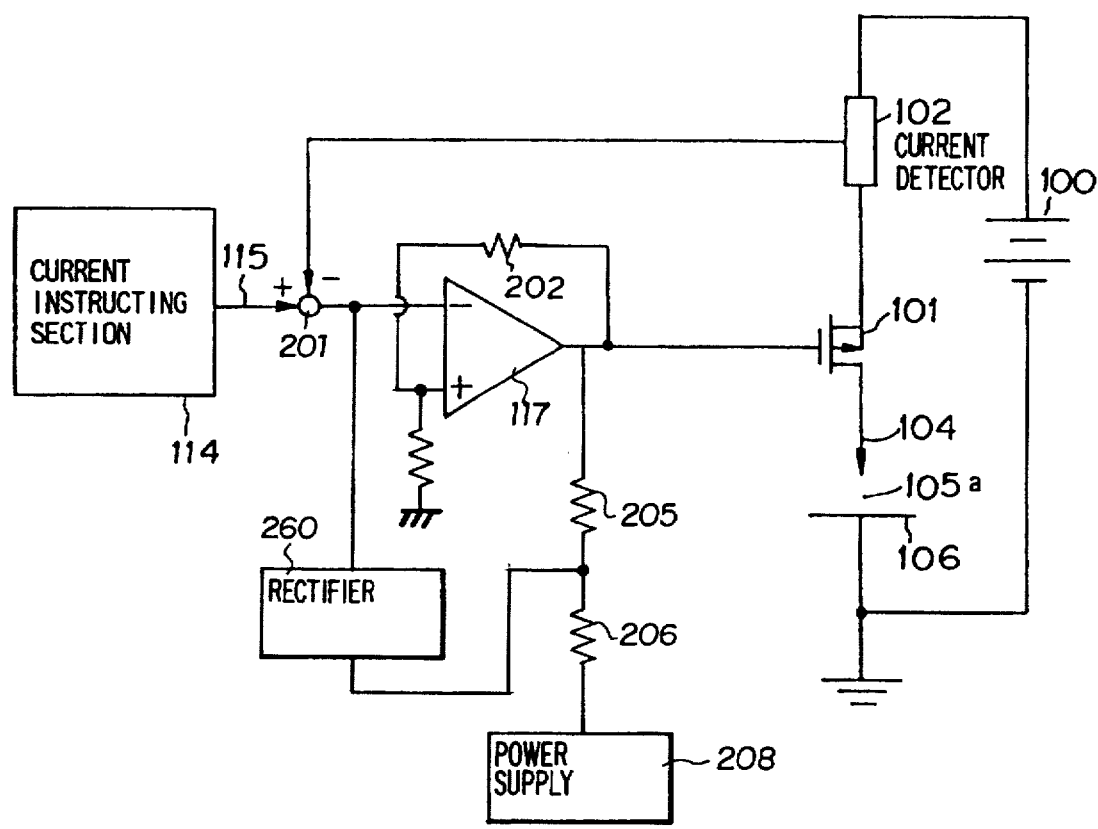

With the configuration described above, it is possible to set the operational amplifier 117 in an active region during the stand-by time, and furthermore the gate voltage in the FET 101 shifts more rapidly, so that a current waveform with a low amount of overshoot can be obtained. In FIG. 3B the operational amplifier 117 is connected as a non-inverting amplifier, with the rectifier 260 connected between the ouput terminal of the operational amplifier 117 and a point between the resistors 205 and 206.

Figure 6A:
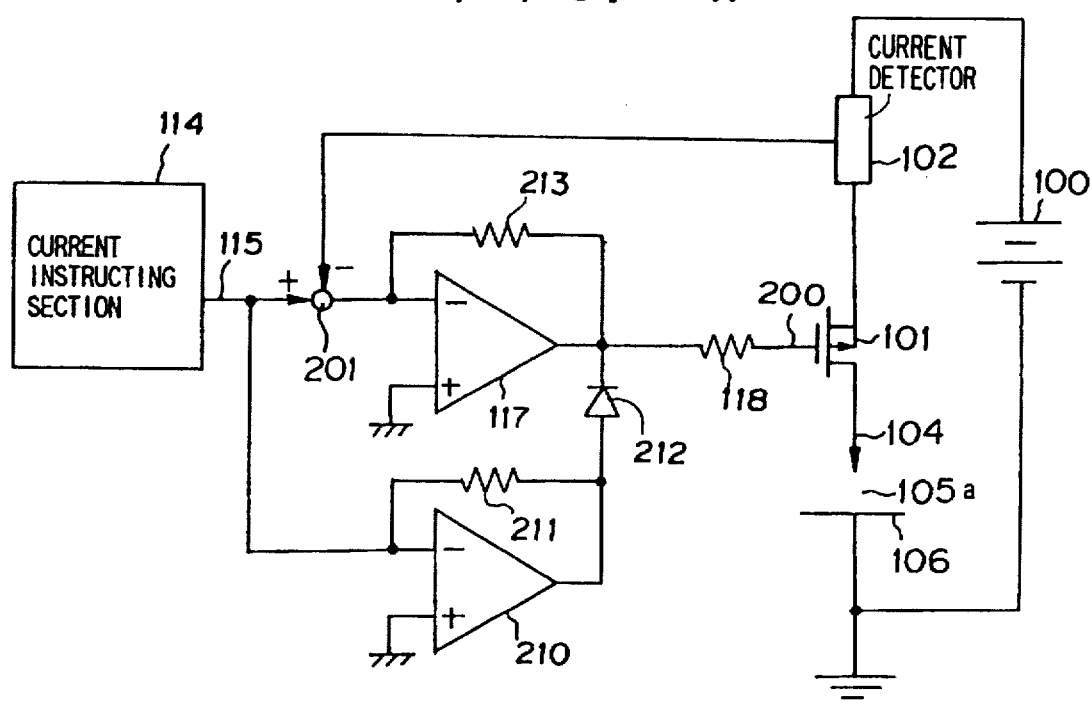
FIGS. 6A and 6B are explanatory views showing the configuration of a power supply unit for an electric discharge machining apparatus according to Embodiment 3 of the present invention.

Next, a description will be given of Embodiment 3 of the present invention. FIG. 6A and FIG. 7 respectively show a schematic diagram of an embodiment according to Embodiment 3 and a waveform diagram depicting signals in the circuit. A waveform of current used during electric discharge machining is not always rectangular, and as shown by a line 132 in FIG. 7, a two-stage rising waveform may be used. In case of this waveform, the current rapidly rises to 22, and then rises more slowly until reaching the current peak value 23. When this waveform is used, electrode consumption is very small.

For obtaining this waveform from a circuit according to the present invention, if either method described above is employed, it would be impossible to set the clamp level 25 to a value smaller than the current peak value, so that when the current is rising to a rising point 22 in the first state, the clamp level 25 is largely different from the target current value 21, and overshoot of the current is generally very large, as shown at 27 in FIG. 7.

In this embodiment, overshoot is reduced, even in cases of complex waveforms, by setting a clamp level as a clamp pattern corresponding to a current waveform.

FIG. 6A shows an example of the circuit. An output 115 from the current instructing section 114 is divided into two portions, which are outputted to the operational amplifier 117 which drives the FET 101 as well as to a second operational amplifier 210. A negative return gain in the second operational amplifier 210 is set to a value which is slightly higher than the gain of the first operational amplifier 117, so that the clamp pattern as shown at 26 in FIG. 7 is generated. This clamp pattern is prepared according to the current instruction signal 115, so as to respond to changes in current peak value. In addition the gate voltage of the FET 101 can be maintained in an appropriate state even against an instruction value for a current waveform having a complicated form other than a rectangular one, so that an extremely precise current waveform can be obtained and the machining performance can be improved.

Figure 6B:
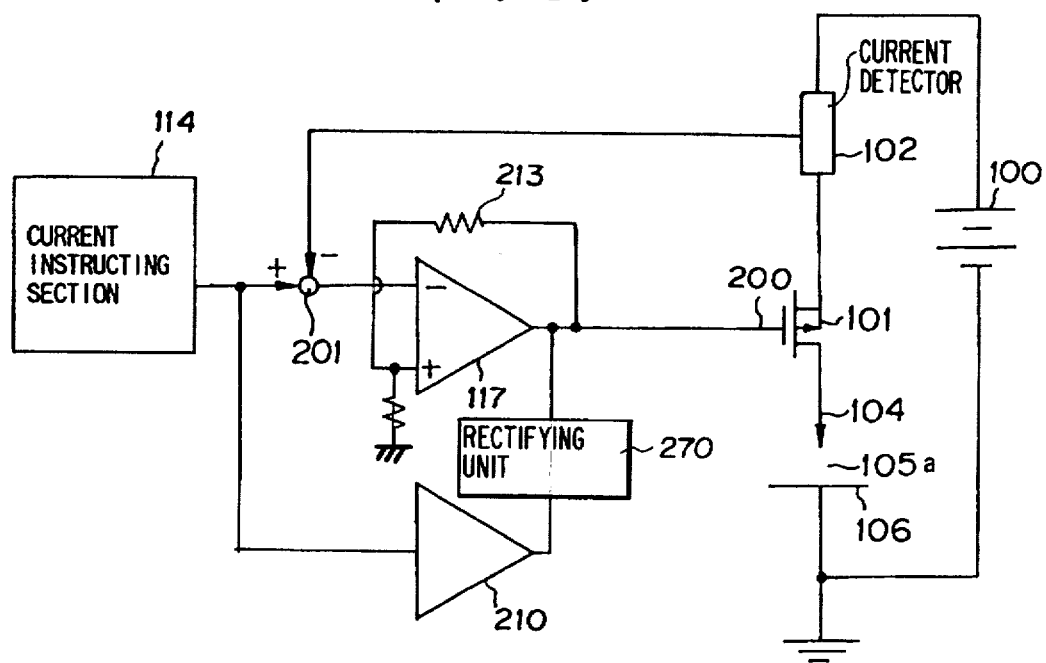
Figure 7A:
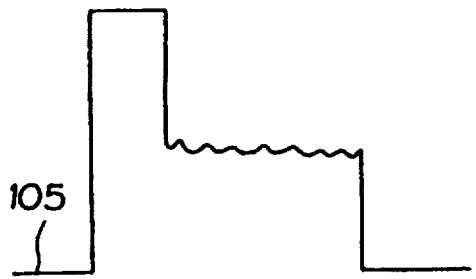
FIG. 7 is an explanatory view for an explanation of operations of the power supply unit for an electric discharge machining apparatus according to Embodiment 3.
Figure 7B:
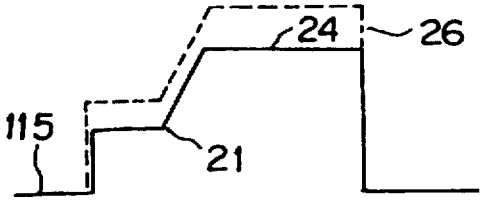
Figure 7C:
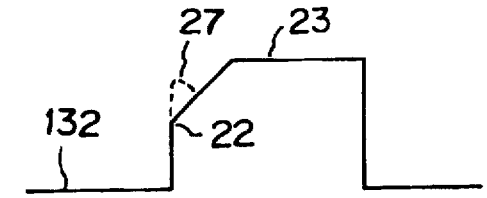
Figure 7D:
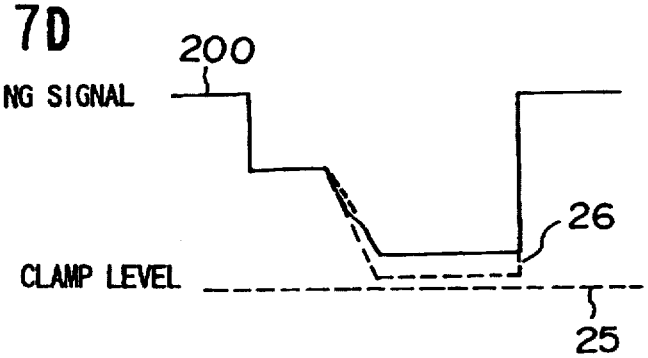

It should be noted that the gain of the second operational amplifier circuit 210 is preferably set to around 1.1 times that of the first operational amplifier circuit. Namely, the FET gate driving signal during stand-by time should preferably be set to a level 10% higher than that instructed by the current instruction value. However, the percentage changes according to the type of FET or operating speed of, for instance, an operational amplifier or the like, so that it should be adjusted and set to an appropriate level in accordance with the case at hand. In FIG. 6B the operational amplifier 117 is connected as a non-inverting amplifier, with the rectifier 270 connected between the output terminal of the operational amplifier 117 and the output terminal of the operational amplifier 210.

Figure 8A:
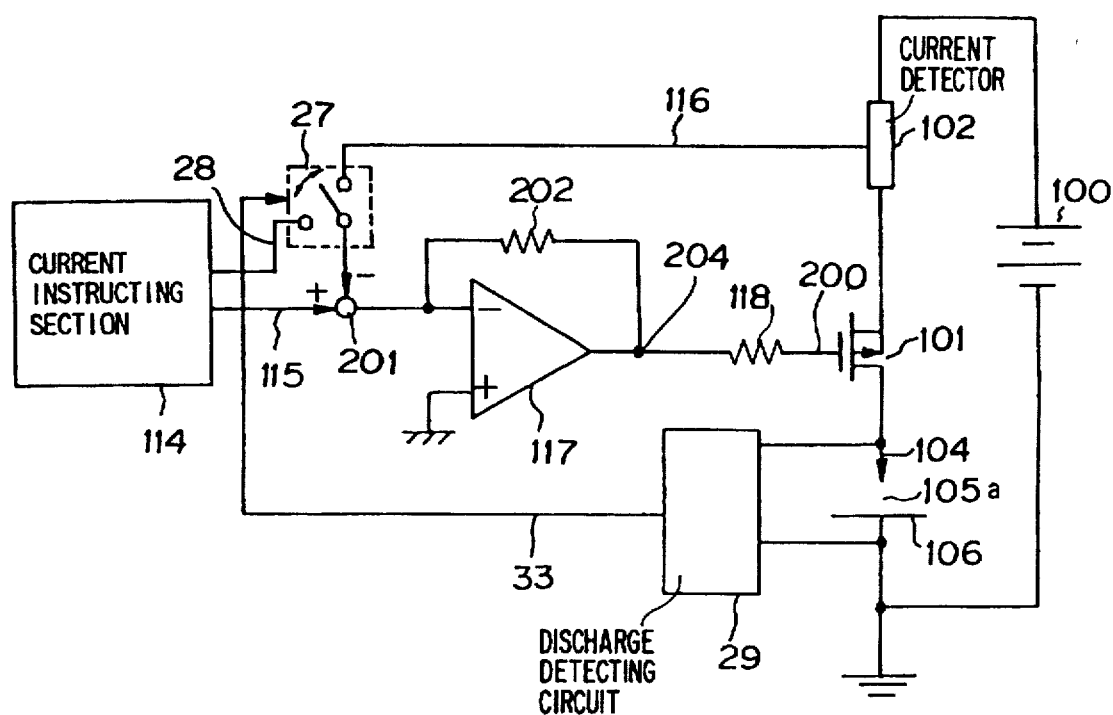

Next, a description will be given of Embodiment 4 of the present invention. FIG. 8A and FIG. 9 respectively show a schematic diagram of the embodiment according to Embodiment 4 and waveforms of certain signals therein. In a power supply unit for an electric discharge machining apparatus according to each of the embodiments described above, a semiconductor amplifier, namely a power MOSFET or the like, is driven in an active region and is used as a variable resistor. By driving the FET 101 according to a detection signal from the current detector 102, feedback control is carried out with respect to the current output waveform to improve the precision of the current waveform as well as the rising speed. However, during the stand-by time after a voltage is applied to a machining gap 105a until electric discharge is actually generated, current feedback control is not established, which is disadvantageous for causing a circuit to run normally without delay.

For this reason, in Embodiment 4 shown in FIGS. 8A, during the stand-by time until generation of electric discharge, the operational amplifier 117 and the FET 101 are prevented from being saturated by disconnecting the current feedback control loop. In this figure, a switch 27 for turning ON/OFF a current detection signal 116 from the current detector 102, namely the current feedback loop, is connected thereto. This switch 27 is constructed and arranged so that a feedback signal is switched according to an instruction 33 from an electric discharge detecting circuit 29 provided separately.

During the stand-by time for electric discharge, an electric discharge stand-by level signal 28 issued separately from a current instruction value waveform from the current instructing section 114 is provided into the feedback loop, and a difference between the electric discharge level signal 28 and the electric discharge current instruction signal 115 is inputted via the subtracter 201 into the operational amplifier 117. A negative return is applied to the operational amplifier 117, so that the output signal therefrom is at a level obtained by multiplying the input by a certain gain.

Namely, the FET gate driving signal 200 obtained in this step is at a level 30 as shown in FIG. 9. What is characteristic in FIG. 9 is that it is possible to adjust the gate signal during the stand-by time to a value which is smaller than that corresponding to the current instruction signal 115 by setting the electric discharge stand-by signal level to an appropriate value. Namely, it is possible to cause the FET 101 functioning as a variable resistor to wait in a state with high resistance. For this reason, overshoot at 31 just when electric discharge is started can be reduced to an extremely small level. In FIG. 8B the operational amplifier 117 is connected as a non-inverting amplifier.

Figure 10A:
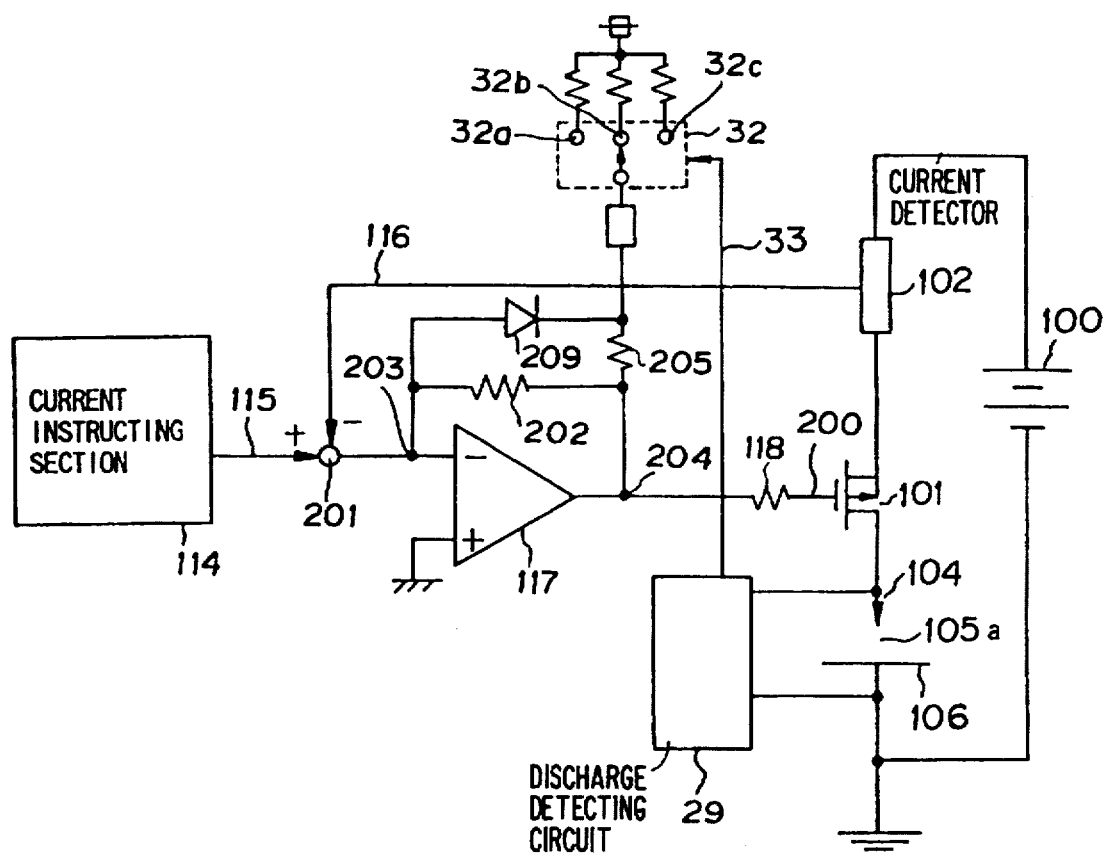
FIGS. 10A and 10B are explanatory views showing the configuration of a power supply unit for an electric discharge machining apparatus according to Embodiment 5 of the present invention.

Next, a description will be given of Embodiment 5 of the present invention. FIG. 10A and FIG. 11 show a schematic diagram of Embodiment 5 and waveforms of certain signals therein, respectively. In this embodiment, the clamp level can be set or released before and after electric discharge. An example in which a complicated waveform can be outputted by changing a clamp level to a clamp pattern was described above, but in this case, the number of operational amplifiers required for the operation increases and the apparatus cost becomes disadvantageously expensive.

In this embodiment, clamping is turned ON or OFF by the switch 32 according to an output 33 from the electric discharge detection circuit 29 by releasing the clamp level set during the stand-by time when electric discharge is started. After electric discharge, an output from the current detector 102 can be obtained, and the current feedback loop 116 rendered operative, so that an output current waveform according to the instruction value can be obtained even if clamping is not effected. Namely, the clamp level during the stand-by time is set to a value corresponding to a current instruction value, and after electric discharge, clamping is released according to a signal from the electric discharge detector 29.

FIG. 12 shows the operation. During the stand-by time for electric discharge shown at 3, one of the clamp levels 32a, 32b, 32c corresponding to the current peak value is selected according to the detection signal 33 from the electric discharge detection circuit 29. If there are choices of three circuits or more, a further appropriate clamp level can be set. If a clamp voltage at a level shown at 32c corresponding to a certain current peak value is selected, the gate voltage 204 of the FET 101 during the stand-by time is set to a low clamp level, as shown at 7a, during the stand-by time.

When electric discharge is started and the electric discharge detector outputs the electric discharge detection signal 33a, the switch 32 having generated the clamp voltage 32a is turned OFF, and the clamp is released with the voltage adjusted to 32d. Then, as a current feedback loop has been formed, the gate voltage 204 in the FET 101 also has reached the level where the desired current is supplied. The current waveform (output current) 132a obtained thus includes no overshoot.

Figure 10B:
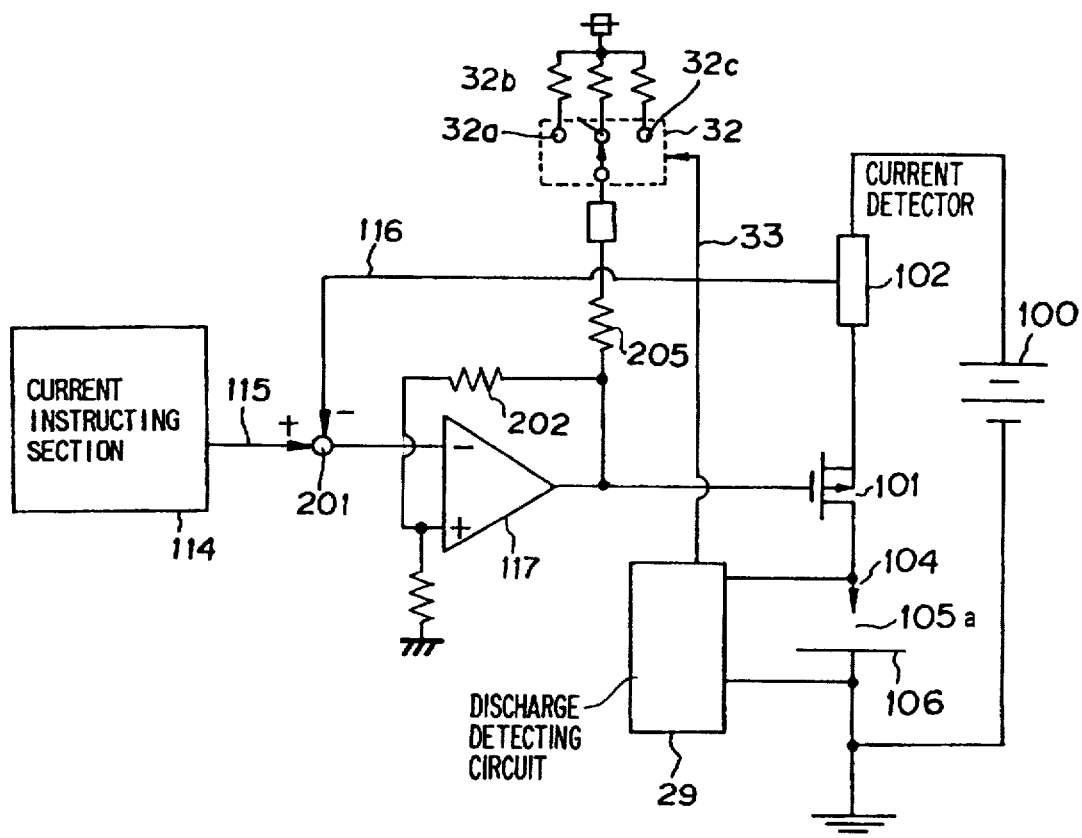
Figure 11A:
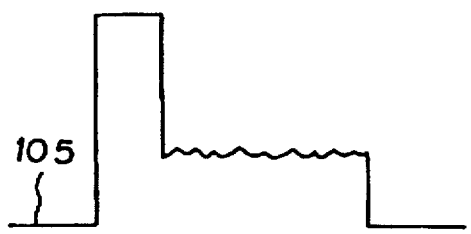
FIG. 11 is an explanatory view for an explanation of the operations of the power supply unit for an electric discharge machining apparatus according to Embodiment 5 above.
Figure 11B:
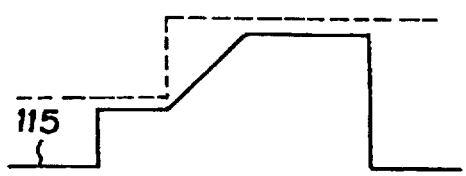
Figure 11C:
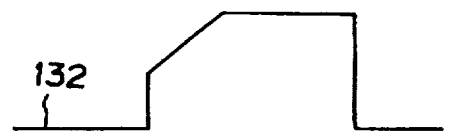
Figure 11D:
Figure 11E:
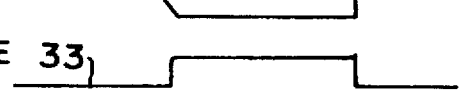

In Embodiment 5 above, a clamp voltage is released simultaneously when electric discharge is started, so that a clamp level may drop to an extremely low level during the stand-by time for electric discharge. Such a phenomenon that only an output current smaller than that corresponding to a current instruction value due to the clamp excess state never occurs, and it is quite easy to set a clamp level. In addition as an adequately small clamp voltage can be loaded, also overshoot of a current can be reduced to an extremely low level. Namely in this embodiment, the circuit configuration can be simplified, the clamp voltage can be set to an extremely low level, and overshoot of the current can be reduced to a very low level. In FIG. 10B the operational amplifier 117 is connected as a non-inverting amplifier.

Figure 13:
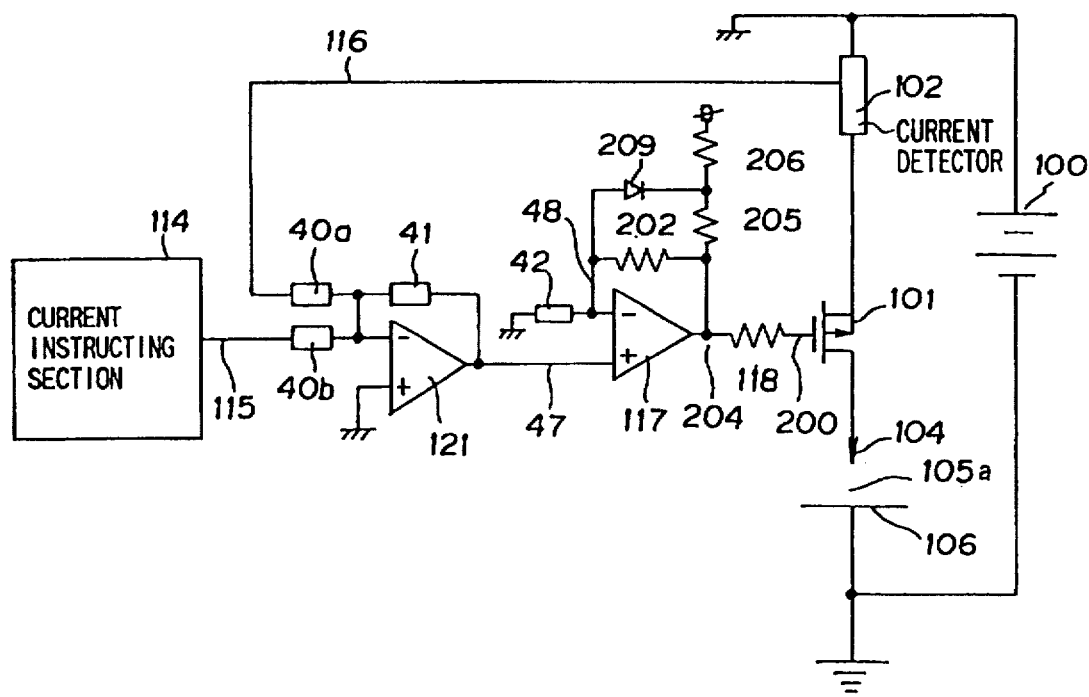
FIG. 13 is an explanatory view for an explanation of the operations of a power supply unit for an electric discharge machining apparatus.

Next, a description will be given of Embodiment 6. FIG. 13 shows Embodiment 6 of the present invention. In each of the embodiments described above, the operational amplifier is implemented as an inverting amplifier, but the same effect can be achieved even if the operational amplifier is a noninverting amplifier.

In FIG. 13, two stages of operational amplifiers 121 and 117 are used, the difference between the current instruction 115 and the actual current value 116 is determined in the first stage of the operational amplifier 121, and a diode 209 for clamping the output is connected to the second stage of the operational amplifier 117. The operational amplifier 117 in the second state is a noninverting amplifier, and the diode 209 is included in the feedback loop. When the output 204 is large (negatively large), the diode 209 is turned ON, and a negative resistance value is provided by the resistors 202 and 205 connected in parallel to each other, so that an operation of lowering the feedback gain is executed.

As the operational amplifier 117 is of the noninverting type, however, generally its gain is not less than unity, so that the output 204 will never be smaller than the input 47. In other words, if gains 40a, 40b, 41 for the first stage operational amplifier 121 are set so that the input 47 will be almost equal to the FET gate driving signal (voltage) 200 or 204 for obtaining corresponding desired current values, the gate voltage during the stand-by time for electric discharge becomes close to a target gate voltage because the gain is restricted by the diode 209. When electric discharge is started, a current feedback signal can be obtained from 116, so that the output from the first step operational amplifier 121 becomes smaller than that during the stand-by time for electric discharge.

Figure 14:
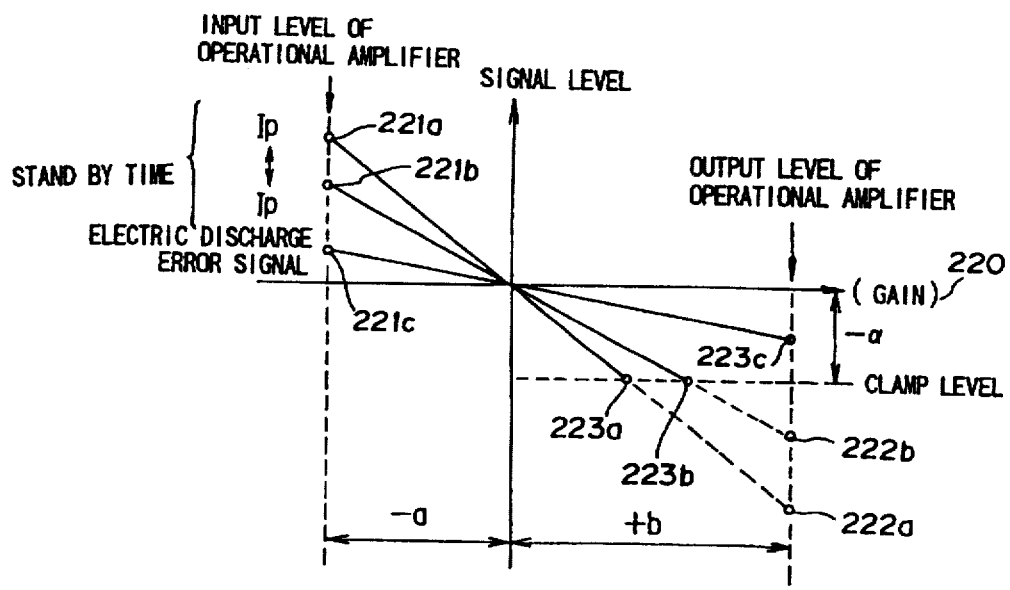
FIG. 14 is an explanatory view for an explanation of the operations of a power supply unit for an electric discharge machining apparatus.
Figure 15:
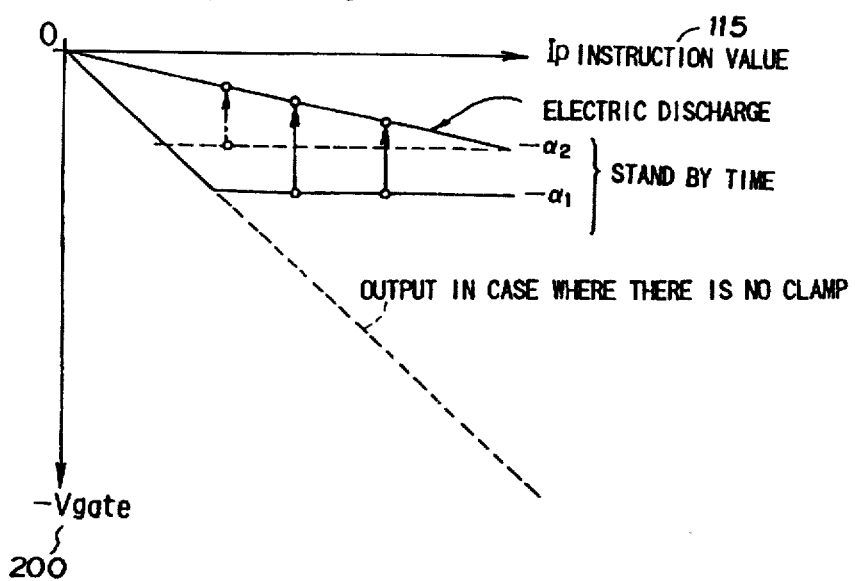
FIG. 15 is an explanatory view for an explanation of the operations of a power supply unit for an electric discharge machining apparatus.
Figure 16:
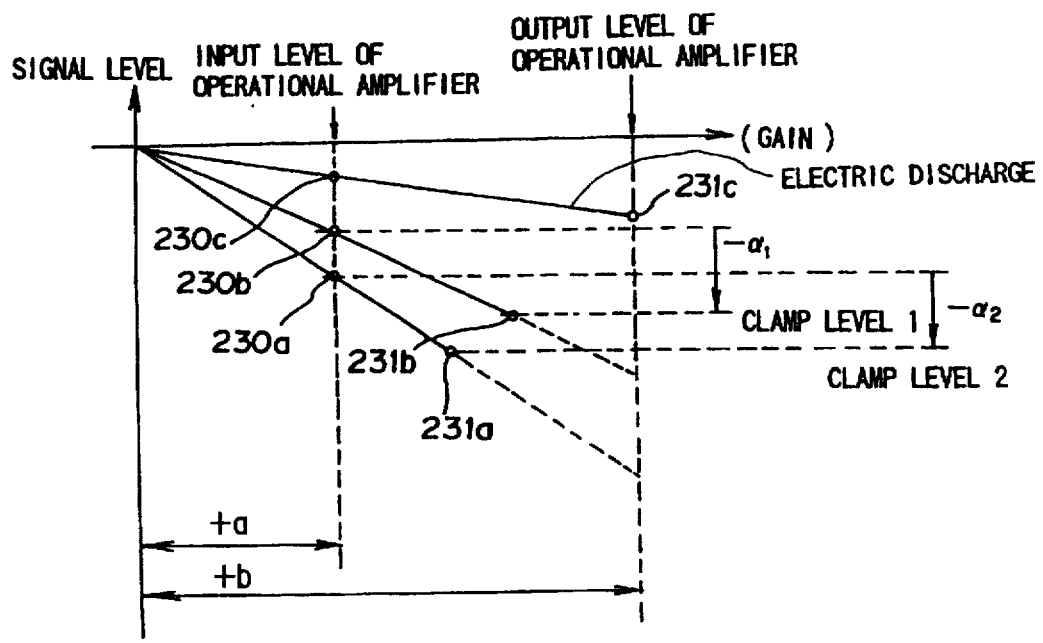
FIG. 16 is an explanatory view for an explanation of the operations of a power supply unit for an electric discharge machining apparatus.
Figure 17:
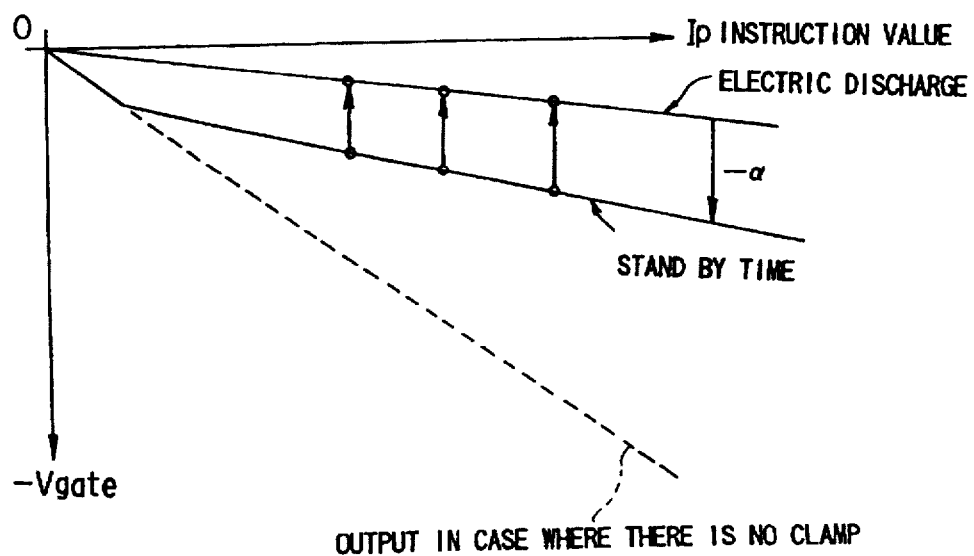
FIG. 17 is an explanatory view for an explanation of the operations of a power supply unit for an electric discharge machining apparatus.

This operation is illustrated in FIG. 14 to FIG. 17. FIG. 14 and FIG. 15 show a case in which a inverting amplifier is used, and show operations of the circuit shown in FIG. 1. FIG. 16 and FIG. 17 show a case in which a noninverting amplifying circuit is used respectively, and show operations of the circuit shown in FIG. 13. In this figure operations of the operational amplifier are shown as proportional operations. FIG. 14 shows input/output to and from the operational amplifier 117, while FIG. 15 shows a gate voltage in the FET 101 according to the current instruction value 115.

Next, a description will be given of FIG. 14. The horizontal axis corresponds to a gain of an inverting amplifier, for which values of −a and +b are set by resistance values of resistors externally connected, and a proportional gain as an inverting amplifier is set.

In this case, a state where the proportional gain is −b/a is shown. Assuming that a level as indicated at 221a is applied to the input terminal 203 of the inverting amplifier in FIG. 1 during the stand-by time, the output 222a would be obtained but for the effect of clamping. That is, only the output as indicated at 223a is obtained because the clamp level has been set to −α. If there is an input at a level 221b to the input terminal 203, the output is similarly clamped and the output 223b is obtained, which indicates that the level is the same as that at 223a, and the output is always clamped to a constant level.

Then, when electric discharge is generated with the current feedback loop restored and the signal level at one input terminal of the operational amplifier drops to a low level, such as that at 221c, the output level becomes below the clamp level, so that clamping is not effected and the normal output 223c is obtained. Thus, when an inverting amplifier is used, an output voltage having a constant values is obtained irrespective of a current instruction value during the stand-by time (on the condition that operations as described in Embodiments 2 to 5 are not performed using an external constant or an external circuit.)

FIG. 15 illustrates the above case using a gate voltage against a current instruction value. During electric discharge, when the output is below the clamp voltage level, a linear type FET gate driving signal (voltage) 200 for the current instruction signal 115 is obtained.

During the stand-by time, an almost constant output voltage of −α is obtained irrespective of the current instruction value. It should be noted that the clamp voltage must be adjusted to an appropriate level by changing the external circuit to obtain an appropriate clamp voltage of, for instance, $-\alpha_1$ or $-\alpha_2$ as described in relation to the embodiments above.

Operations of a noninverting circuit are shown in FIG. 16 and FIG. 17. In case of a noninverting amplifier, as a gain of unity or more can be obtained, the output voltage will never drop below the input voltage for the noninverting amplifier irrespective of the set value for clamping in the feedback loop. In FIG. 16, the gain is set to a factor of b/a. The input voltage is as shown at 230a, 230b, and 230c indicates an output voltage level during electric discharge. During electric discharge, an output voltage returns as feedback, so that the input signal level to the noninverting amplifier is low, as shown in this figure.

Then, as the feedback diode 209 in the noninverting amplifier 117 has been turned OFF, a normal proportional gain is obtained. In contrast, during the stand-by time, as the output current has not yet returned as feedback, the input signal level to the noninverting amplifier 117 becomes large, as shown at 230b and 230c. Then, the feedback diode 209 is electrically connected, and the resistor 205 is included in parallel to the resistor 202 as a feedback resistor in the feedback loop, so that the gain of the noninverting amplifier 117 drops. For this reason, the output drops to a level as shows at 231a or 231b.

FIG. 17 shows this operation with the relation between a current instruction value and a gate voltage. As clearly shown in FIG. 17, even if the current instruction value becomes large, the output voltage level during the stand-by time becomes larger proportionally, so that a voltage close to the optimal clamp voltage can be maintained.

Thus, by using an output clamp circuit including a noninverting amplifier and a diode, it is possible to easily and appropriately construct a control circuit. In the description above, it is assumed that the circuits for both an inverting amplifier and a noninverting amplifier include only resistors and a diode, but a more optimal control system can be constructed by inserting a circuit whose purpose is to effect a gain increase at a low signal level or to effect phase compensation over a broad range.

As described above, in a power supply unit for a discharge apparatus according to the present invention, the rising speed of a current waveform obtained in a machining gap is extremely high with a small amount of overshooting. Also, a waveform extremely close to that instructed by a current instruction value can be obtained, so that a stable machining state can be obtained and a high machining speed can be realized.

In a power supply unit for a discharge apparatus according to the present invention, the closer the gate driving signal 200 for an operational amplifier and the FET 101 during the stand-by time is to the current peak value, the more the overshoot can be reduced, so that an output current waveform closer to a current instruction value can be obtained and as a result a surface of a workpiece can be machined to a uniform surface at a high speed.

In a power supply unit for a discharge apparatus according to the present invention, an output from a current instructing section is divided into two portions, which are outputted to an operational amplifier driving the FET 101 as well as to the second operational amplifier. By setting a negative return gain for the second operational amplifier to a value slightly higher than the gain for the first operational amplifier, a prespecified clamp pattern can be generated. As the clamp pattern is set according to a current instruction value, it can be modified to change a current peak value, and the gate voltage in the FET 101 can be maintained in the optimal state even in the case of an instruction value for a complex waveform (other than a rectangular waveform), so that an extremely precise current waveform can be generated.

In a power supply unit for a discharge apparatus according to the present invention, by setting the electric discharge stand-by signal level to an appropriate value, the gate signal during the stand-by time can be reduced to a level lower than that corresponding to the current instruction value. Namely, as it is possible to cause the FET 101 functioning as a variable resistor to stand by in a state where the resistance is high, it is possible to minimize the overshoot which occurs simultaneously when shifting to electric discharge processing.

In a power supply unit for a discharge apparatus according to the present invention, a phenomenon whereby only an output current smaller than that corresponding to a current instruction value can be obtained because of overclamping never occurs, and it is quite easy to set the clamp level. At the same time, as it is possible to apply an adequately small clamp voltage, overshoot of the current can be reduced to a minimum level.

In a power supply unit for a discharge apparatus according to the present invention, even if the current instruction value becomes large, the output voltage level during the stand-by time becomes larger proportionally, a voltage extremely close to the optimal clamp voltage can be maintained, and also by using an output clamp circuit employing a noninverting amplifier and a diode therein, it is possible to easily and appropriately construct a control circuit.

Thus, with the power supply unit for a discharge apparatus according to the present invention, it is possible to obtain a desired machining current waveform easily, precisely and at a high speed, so that electric discharge machining can be stabilized, a high machining speed can be realized, and machining with excellent electrode consumption characteristics can be realized.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply unit for a discharge apparatus comprising:
    a discharger provided with a DC power supply source, an amplifier and a current detector connected to each other in series;
    a current instructing section for outputting a current instruction value corresponding to a pulse form of a discharge current pulse;
    an operational amplifier for driving said amplifier by amplifying a difference between a current instruction value outputted from said current instructing section and an output current value detected by said current detector;
    a power supply unit for driving said operational amplifier; and
    a clamping section connected in series between an output terminal of said operational amplifier and said power supply unit for clamping an active area of said amplifier.

2. A power supply unit for a discharge apparatus according to claim 1, wherein said operational amplifier comprises an inverting amplifier.

3. A power supply unit for a discharge apparatus according to claim 1, wherein said operational amplifier comprises a noninverting amplifier.

4. A power supply unit for a discharge apparatus comprising:
    a discharger provided with a DC sower supply source, an amplifier and a current detector connected to each other in series;
    a current instructing section for outputting a current instruction value corresponding to a pulse form of a discharge current pulse;
    an operational amplifier for driving said amplifier by amplifying a difference between a current instruction value outputted from said current instructing section and an output current value detected by said current detector;
    a power supply unit for driving said operational amplifier;
    a clamping section connected in series between an output terminal of said operational amplifier and said power supply unit for clamping an active area of said amplifier; and
    a switch section for switching a clamp level of said clamping section.

5. A power supply unit for a discharge apparatus comprising:
    a discharger provided with a DC power supply source, an amplifier, and a current detector connected to each other in series in a machining gap consisting a machining electrode and a workpiece;
    a current instructing section for outputting a current instruction value corresponding to a pulse form of a discharge current pulse;
    an operational amplifier for driving said amplifier by amplifying a difference between a current instruction value outputted from said current instructing section and an output current value detected by said current detector;
    a power supply unit for driving said operational amplifier;
    a plurality of resistors connected to each other in series between an output terminal of said operational amplifier and said power supply unit; and
    a rectifying unit connected between said resistors and between said resistor and an input terminal of said operational amplifier.

6. A power supply unit for a discharge apparatus according to claim 5, wherein said operational amplifier comprises an inverting amplifier.

7. A power supply unit for a discharge apparatus according to claim 5, wherein said operational amplifier comprises a noninverting amplifier.

8. A power supply unit for a discharge apparatus according to claim 5, wherein at least one of said resistors is a variable resistor for setting a resistance value according to an output from said current instructing section.

9. A power supply unit for a discharge apparatus comprising:
    a discharger provided with a DC power supply source, an amplifier and a current detector connected to each other in series in a machining gap consisting of a machining electrode and a workpiece;

a current instructing section for outputting a current instruction value corresponding to a pulse form of a discharge current pulse;

an operational amplifier for driving said amplifier by amplifying a difference between a current instruction value outputted from said current instructing section and an output current value detected by said current detector;

a power supply unit for driving said operational amplifier;

a plurality of resistors connected to each other in series between an output terminal of said operational amplifier and said power supply unit;

a rectifying unit connected between said resistor and an input terminal of said operational amplifier; and a switch section for switching said resistors according to an output from said current instructing section.

10. A power supply unit for a discharge apparatus comprising:

a discharger provided with a DC power supply source, an amplifier, and a current detector connected to each other in series in a machining gap between a machining electrode and a workpiece;

a current instructing section for outputting a current instruction value corresponding to a pulse form of a discharge current pulse;

a first operational amplifier for driving said amplifier by amplifying a difference between the current instruction value outputted from said current instructing section and an output current value detected by said current detector;

a second operational amplifier for multiplying an output signal from said current instruction section by a constant; and a rectifying unit connected to an output terminal of said first operational amplifier as well as to that of said second operational amplifier.

11. A power supply unit for a discharge machining apparatus according to claim 10, wherein said operational amplifier comprises an inverting amplifier.

12. A power supply unit for a discharge machining apparatus according to claim 10, wherein said operational amplifier comprises a noninverting amplifier.

13. A power supply unit for a discharge apparatus comprising:

a discharger provided with a DC power supply source, an amplifier, and a current detector connected to each other in series in a machining gap between a machining electrode and a workpiece;

a current instructing section for outputting a current instruction value corresponding to a pulse form of a discharge current pulse;

an operational amplifier for driving said amplifier by amplifying a difference between a current instruction value outputted from said current instructing section and an output current value detected by said current detector;

a discharge detector for detecting electric discharge in said machining gap; and a switch connected between said current detector and said operational amplifier for switching an output current value from said current detector according to an output signal from said discharge detector.

14. A power supply unit for a discharge machining apparatus according to claim 13, wherein said operational amplifier comprises an inverting amplifier.

15. A power supply unit for a discharge machining apparatus according to claim 13, wherein said operational amplifier comprises a noninverting amplifier.

16. A power supply unit for a discharge apparatus comprising:

a discharger provided with a DC power supply source, an amplifier, and a current detector connected to each other in series in a machining gap between a machining electrode and a workpiece;

a current instructing section for outputting a current instruction value corresponding to a pulse form of a discharge current pulse;

an operational amplifier for driving said amplifier by amplifying a difference between a current instruction value outputted from said current instructing section and an output current value detected by said current detector;

a power supply unit for driving said operational amplifier;

a plurality of resistors connected to each other in series between an output terminal of said operational amplifier and said power supply unit;

a discharge detector for detecting electric discharge in said machining gap; and a switch for switching said resistors according to an output from said discharge detector.

17. A power supply unit for a discharging apparatus according to claim 16, wherein said operational amplifier comprises an inverting amplifier.

18. A power supply unit for a discharging apparatus according to claim 16, wherein said operational amplifier comprises a noninverting amplifier.

* * * * *